Jan. 31, 1950
R. B. HOFFMAN ET AL
2,495,722
DISTANCE INDICATING SYSTEM
Filed Oct. 2, 1944
2 Sheets-Sheet 1
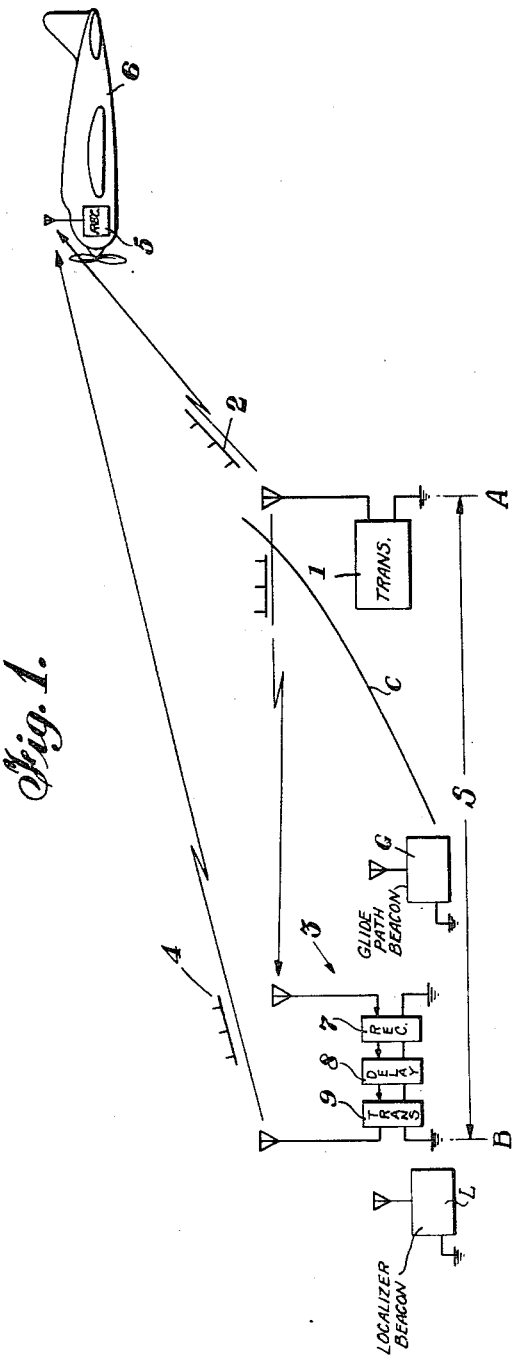
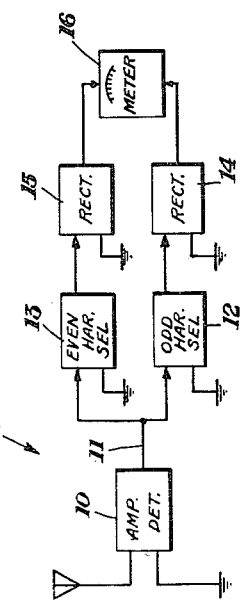
INVENTORS
ROSS B. HOFFMAN
PAUL R. ADAMS
BY
*R P Morris*
ATTORNEY Jan. 31, 1950   R. B. HOFFMAN ET AL   2,495,722
DISTANCE INDICATING SYSTEM
Filed Oct. 2, 1944   2 Sheets—Sheet 2

INVENTORS
ROSS B. HOFFMAN
PAUL R. ADAMS
BY
R P Morris
ATTORNEY

Patented Jan. 31, 1950

2,495,722

UNITED STATES PATENT OFFICE 2,495,722

DISTANCE INDICATING SYSTEM

Ross B. Hoffman, Glen Ridge, and Paul R. Adams, Cranford, N. J., assignors to Federal Telephone and Radio Corporation, New York, N. Y., a corporation of Delaware Application October 2, 1944, Serial No. 556,720

4 Claims. (Cl. 343—6)

This invention relates to distance indicating systems and more particularly to distance indicating systems wherein the distance indications are produced in a receiver by radio transmission.

Systems have been proposed wherein the direction along a course line may be determined by comparing the time spacing of pulses received from spaced transmitter points, the transmitter points being spaced apart substantially transversely of the desired course line. In these proposed systems, simple comparing devices operating to compare the amplitude of harmonics derived from the various received pulses have been proposed.

It is an object of our invention to provide a distance indicating system wherein the distance of a craft along a predetermined course may be obtained by comparison of two series of received pulses.

It is another object of our invention to provide a system for indicating the distance of a craft from the point of contact while coming in to a landing.

It is a further object of our invention to provide a distance indicating system wherein the time of arrival of pulses from two spaced transmitters spaced along the course line and transmitted with different time delays may be compared on a receiver to provide an indication of distance of the receiver along the course.

It is a still further object of our invention to provide a system wherein the distance along a course intermediate two spaced transmitter points may be simply obtained by time comparison of pulses transmitted from these two sources at points along the course intermediate the transmitting stations.

According to a feature of our invention, we may provide a transmitter at a predetermined point along a given course for transmitting a series of pulses at a given repetition frequency. At a predetermined spaced point along the course is provided a repeater station for repeating pulses transmitted from said transmitter with a predetermined delay. As a consequence, along a course line will be produced a composite series of pulses comprising the directly transmitted and the repeated pulses. At points along the course outside the line between the transmitter and repeater, the pulses of the composite train will have a constant predetermined spacing. However, at points intermediate the transmitter and repeater station, the effective spacing between the directly transmitted and the repeated pulses will vary. By comparing the timing of the pulses of these two series, the distance along the course between the transmitter and repeater station may be readily obtained. At points along the course outside the transmitter a predetermined distance will continuously be indicated. The distance indicating system is particularly useful for providing on a craft the distant indications while coming in to a landing. A localizer beacon may be provided to indicate the azimuth direction and a glide path beacon of suitable form to indicate the altitude position of the craft. This glide path system may be designed to become effective between the two radiators.

The timing of these pulses may be conveniently compared in a simple meter indicating system by deriving from the received pulses an odd harmonic, including the first harmonic or fundamental frequency, and an even harmonic. These harmonics may be compared in amplitude to give an indication of the distance of the craft along the course. By suitably timing the normal displacement between the pulses of the two series and suitably calibrating the indicator, an indication of a fixed distance equal to the spacing between the transmitter and the repeater will be observed for points along the course until the transmitter is reached. At points intermediate the transmitter and repeater, this indication will gradually decrease until it reduces to zero at a point directly above the repeater station. Preferably the meter is directly calibrated in units of distance so a direct indication may be had.

A better understanding of our invention and the objects and features thereof may be had from the particular description of embodiments thereof made with reference to the accompanying drawings, in which:

Fig. 1 is a simplified diagrammatic shown of a complete distance indicating system in accordance with our invention;

Fig. 2 is a block circuit diagram of a receiver indicator circuit for use in accordance with the principles of our invention.

Figure 3:
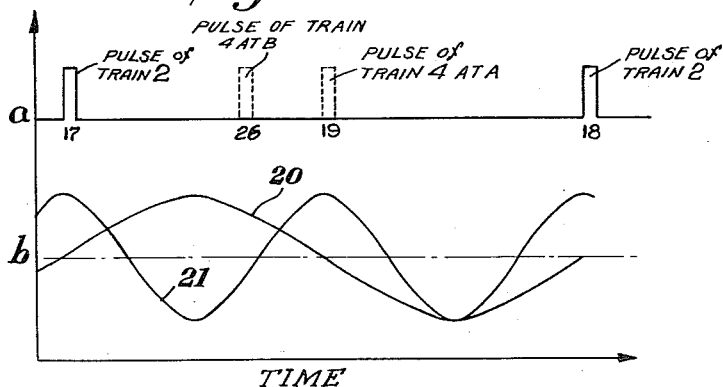
Figs. 3, 4 and 5 are diagrammatic illustrations used in explaining the operation of a distance indicator in accordance with our invention.

Turning first to Fig. 1, at a fixed point A is provided a transmitter 1 which serves to transmit a series or train of pulses 2 having a predetermined time spacing at a given repetition frequency. At a second point B along the course line is provided a second transmitter means 3 for transmitting a second series of pulses 4 having the same given repetition frequency as the pulses of train 2. The pulses of train 4 are delayed a predetermined amount with respect to the pulses of train 2 so that along the given course outside the space between points A and B a composite pulse train having a predetermined relatively fixed pulse spacing will effectively exist. A receiver 5 is provided, mounted preferably on a movable craft such as aircraft 6, for receiving both trains of pulses 2 and 4. By comparing the timing of the pulses of trains 2 and 4 for receiver 5, an indication of the distance of craft 6 along the predetermined course C may be obtained. The predetermined course C may be defined by any desired means such as localizes beacon L, and a glide path beacon G. Preferably, second transmitter means 3 is a repeater station comprising a receiver 7, a delay means 8 and a transmitter means 9. As a consequence, pulses from train 4 at points outside transmitter 1 will have an effective delay with respect to the pulses of train 2 equal to the delay caused by twice traversing the space S between points A and B and the additional delay introduced by delay means 8. This delay may be so chosen that pulses 4 are delayed substantially 180° with respect to pulses 2 so that these pulses will occur midway between the pulses of train 2 at points outside transmitter 1. Accordingly, harmonic content of the composite train will be constant at points beyond point A and will vary after receiver 5 passes transmitter 1. A simple indication of the timing may be obtained by comparison of these harmonics.

A circuit of receiver 5 suitable for use on a craft such as 6 is shown in greater detail in Fig. 2. This receiver 5 comprises an amplifier detector arrangement 10, the output of which coupled over a line 11 to harmonic selectors 12 and 13 designed to select an odd and an even harmonic, respectively. These selected harmonics may be first rectified in rectifiers 14 and 15 and applied to a comparison meter 16. In meter 16 the relative spacing of the pulses received may be indicated by means of a simple amplitude comparison of the harmonics derived from the received composite waves. Preferably meter 16 is calibrated directly in units of distance so that the distances along course C between points A and B will be directly indicated.

Figure 4:
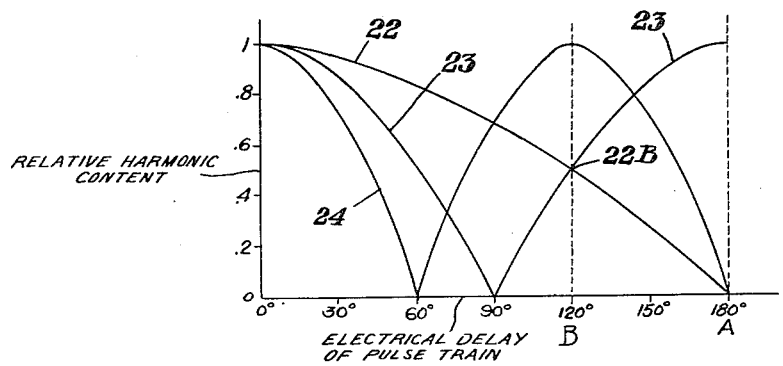

A clearer understanding of the operation of our system with the use of the harmonic selectors may be had by reference to the graphs shown in Figs. 3 and 4. Turning first to Fig. 3, pulses of train 2 are shown at 17, 18 spaced apart a predetermined amount. If the spacing between transmitter 1 and transmitting means 3 is chosen, for example, at 30° of the cycle defined by pulses 17 and 18 and delay line 8 is made equal to 120°, then the pulses of train 4 will appear midway between pulses 17 and 18 of train 2 as shown at 19, Fig. 3, at points along the course outside transmitter 1. As a consequence, the fundamental frequency, curve 20 of Fig. 3, will be substantially non-existent while the second harmonic shown at 21 will have a maximum value. By comparing these two waves, an indication of the distance within the space defined by points A, B will be made.

Turning to Fig. 4, the variation of the fundamental wave 20 between zero and 180° spacing of the two series of pulses is shown at 22. It will be noted that curve 22 starts with unity at zero displacement and reduces to zero at 180°. The second harmonic content of the composite pulse train shown at 23 reduces from unity at zero displacement to zero value at 90° and again reaches unity at 180°. It will be noted that curve 23 crosses curve 22 at a given point 22B spaced 120° from the zero line. Accordingly, if transmitter 1 is spaced 30° from transmitter 3 and the delay in transmitter 3 is 120° then the desired phase relationship outlined above may be obtained between the fundamental and second harmonic. It will, of course, be understood that other harmonics such as the third harmonic shown at 24 may be used if desired. In the example given, the values of the first and second harmonic and their differences at 10° intervals between 120 and 180 degrees is given in the following table:

| $b$ | $\theta$ 1st sin | $\theta$ 2nd sin | Difference |
|---|---|---|---|
| 120° | .5 | .5 | 0 |
| 130° | .4226 | .643 | .22 |
| 140° | .342 | .766 | .424 |
| 150° | .259 | .866 | .607 |
| 160° | .174 | .94 | .77 |
| 170° | .087 | .985 | .9 |
| 180° | 0 | 1 | 1 |

Figure 5:
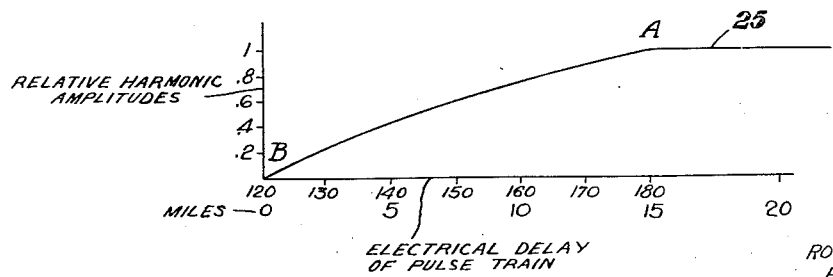

Accordingly, turning to Fig. 5 it will be seen that if these harmonics are compared in phase opposition, the unity indication will be obtained on the craft until point A is reached, as shown in curve 25 of Fig. 5. As the craft continues on toward point B, these values will decrease from unity toward zero reaching zero at point B. By suitably calibrating an indicator meter, the distance in miles between points A and B may readily be determined. For example, if the spacing A, B is equal to 15 miles, the time for travel of the wave from A to B will be equal to 76 microseconds, which is assumed to be approximately 30°. The periodicity then of the pulses of train 2 will be equal to 900 microseconds and the pulsing frequency will then be 1110 cycles.

It should be clear that any desired value of spacing and frequencies may be chosen. Furthermore, comparison may be made on more complex instruments such as cathode ray oscillographs, for example, so that direct comparison of the pulse spacing may be obtained. Furthermore, while the particular phase relationship wherein the signals reduce from a fixed maximum value to zero is convenient for indications, any other timing suitably calibrated may be used.

It should be distinctly understood that the specific circuit arrangements shown and described herein are given merely by way of illustration and are not to be considered as any limitation on the scope of the invention as described in the objects thereof and the accompanying claims.

We claim:

1. A distance indicating system for providing a distance indication along a given course line comprising a first transmitter for transmitting a series of discrete pulses of a given repetition frequency from a given point on said course line, a second transmitter spaced a predetermined distance along said course line from said given point for transmitting a second series of discrete pulses at said repetition rate, a receiver means for receiving both said series of pulses at points along said course line, and means for deriving from said received pulses waves of an odd and an even harmonic of said repetition frequency, and means for amplitude comparing said derived harmonic waves.

2. A method of distance indication along a given course line comprising transmitting from a first given point on said line a series of discrete pulses of a given repetition frequency, transmitting from a second given point along said course line a second series of discrete pulses of said given repetition rate, delaying said second series of pulses a predetermined amount with respect to said first series of pulses, receiving said first and second series of pulses at a point along said line, deriving waves of an odd and an even harmonic from said received pulses, and amplitude comparing said derived harmonic waves to provide a distance indication.

3. A distance indication system comprising a pulse transmitter for transmitting discrete pulses at a given repetition frequency, a repeater spaced from said transmitter in a line along a course, said repeater serving to repeat pulses transmitted from said transmitter, and receiver means for receiving pulses from said transmitter and said repeater, means for deriving waves of an odd and an even multiple of said repetition frequency from said received pulses and means for comparing said derived waves to indicate the distance of said receiver along said course line.

4. A distance indicating system comprising a first transmitter means located at a given point along a course line for transmitting uniformly spaced pulses at a given repetition frequency, a repeater means located at a point spaced a predetermined distance along said course from said transmitter means for repeating pulses from said first transmitter means, delay means for giving to said repeated pulses a predetermined constant delay, said spacing and said delay being such that the repeated pulses, at points along said course beyond said transmitter means, are effectively delayed by half the period of said repetition frequency, the spacing between said transmitter and said repeater being substantially 30 electrical degrees at said repetition frequency, further comprising receiver means for receiving said transmitted and said received pulses, means for deriving from said received pulses the fundamental frequency at said repetition frequency and the second harmonic of said fundamental and said harmonic frequency waves to produce an indication of the distance of said receiver along said course at points intermediate said transmitter and said repeater.

ROSS B. HOFFMAN.
PAUL R. ADAMS.

REFERENCES CITED

The following references are of record in the file of this patent:

UNITED STATES PATENTS

| Number | Name | Date |
|---|---|---|
| 941,565 | Fessenden | Nov. 30, 1906 |
| 1,615,712 | Loth | Jan. 25, 1927 |
| 2,050,276 | Chubb | Aug. 11, 1936 |
| 2,083,945 | Evans | June 15, 1937 |
| 2,134,716 | Gunn | Nov. 1, 1938 |
| 2,256,336 | Beatty | Sept. 16, 1941 |
| 2,328,944 | Beatty | Sept. 7, 1943 |
| 2,403,626 | Wolff | July 9, 1946 |
| 2,405,238 | Seeley | Aug. 6, 1946 |
| 2,419,525 | Alford | Apr. 29, 1947 |
| 2,427,220 | Luck | Sept. 9, 1947 |
| 2,441,956 | Deloraine | May 25, 1948 |